US012679959B2

(12) United States Patent
Choi et al.

(10) Patent No.: US 12,679,959 B2
(45) Date of Patent: Jul. 14, 2026

(54) METHOD FOR PRODUCING RUBBER COMPOSITION, RUBBER COMPOSITION AND TIRE PRODUCED BY EMPLOYING THE SAME

(71) Applicant: HANWHA TOTAL PETROCHEMICAL CO., LTD., Chungcheongnam-do (KR)

(72) Inventors: Jun Keol Choi, Chungcheongnam-do (KR); Do Hoon Lee, Chungcheongnam-do (KR); Sung Kyo Jung, Chungcheongnam-do (KR); Yeon Shick Yoo, Chungcheongnam-do (KR)

(73) Assignee: Hanwha Total Petrochemical Co., Ltd., Chungcheongnam-do (KR)

( * ) Notice: Subject to any disclaimer, the term of this patent is extended or adjusted under 35 U.S.C. 154(b) by 1158 days.

(21) Appl. No.: 17/371,747

(22) Filed: Jul. 9, 2021

(65) Prior Publication Data

US 2022/0186000 A1 Jun. 16, 2022

(30) Foreign Application Priority Data

Dec. 15, 2020 (KR) ......................... 10-2020-0175537

(51) Int. Cl.
| | |
|---|---|
| *C08L 9/06* | (2006.01) |
| *B60C 1/00* | (2006.01) |
| *C08F 2/24* | (2006.01) |
| *C08F 210/08* | (2006.01) |
| *C08L 7/00* | (2006.01) |
| *C08L 91/00* | (2006.01) |

(52) U.S. Cl.
CPC .............. *C08L 9/06* (2013.01); *B60C 1/0016* (2013.01); *C08F 2/24* (2013.01); *C08F 210/08* (2013.01); *C08L 7/00* (2013.01); *C08L 91/00* (2013.01); *C08L 2205/03* (2013.01); *C08L 2205/22* (2013.01)

(58) Field of Classification Search
CPC ...... C08L 9/00; C08L 9/02; C08L 9/04; C08L 9/06; C08L 9/08; C08L 9/10; C08L 11/00; C08L 13/00; C08L 13/02; C08L 15/00; C08L 7/00; C08L 7/02; C08L 19/00; C08L 23/18
See application file for complete search history.

(56) References Cited

U.S. PATENT DOCUMENTS

2020/0056012 A1 2/2020 Jung et al.

FOREIGN PATENT DOCUMENTS

| JP | 2007297416 | A | 11/2007 |
|---|---|---|---|
| JP | 2008255168 | A | 10/2008 |
| JP | 2016098296 | A | 5/2016 |
| JP | 6120949 | B2 | 2/2017 |
| JP | 6737440 | B2 | 6/2018 |
| JP | 2019218464 | A | 12/2019 |
| JP | 2020029555 | A | 2/2020 |

OTHER PUBLICATIONS

JP2007297416 machine translation (Year: 2024).*
JP2008255168 machine translation (Year: 2024).*

* cited by examiner

*Primary Examiner* — Jeffrey S Lenihan
(74) *Attorney, Agent, or Firm* — Hamilton, Brook, Smith & Reynolds, P.C.

(57) ABSTRACT

A method for preparing a rubber composition capable of improving the physical properties of a final product is disclosed. A rubber composition is prepared by dispersing polybutene in rubber in a solution phase (PIB extended rubber). The method comprises dispersing hydrophobic extender oil and polybutene in water to prepare an extender oil/polybutene emulsion; adding the extender emulsion to a latex-shaped rubber composition and uniformly dispersing the same in a solution to prepare a rubber/extension oil/polybutene composition; and solidifying, drying and molding the composition in a latex shape through salting-out and acid precipitation. When the rubber composition is applied to a tire tread composite material, the durability, grip property and low rotational resistance are improved, thereby attaining improved braking characteristic, low fuel consumption characteristic, and wear performance.

4 Claims, No Drawings

METHOD FOR PRODUCING RUBBER COMPOSITION, RUBBER COMPOSITION AND TIRE PRODUCED BY EMPLOYING THE SAME

CROSS-REFERENCE TO RELATED APPLICATION

This application claims priority under 35 U.S.C. § 119 or 365 to Korean Patent Application No. 10-2020-0175537, filed on Dec. 15, 2020. The entire teachings of the above application is incorporated herein by reference.

BACKGROUND

1. Field

The present disclosure relates to a method for producing a rubber composition, a rubber composition and a tire produced by employing the same.

2. Description of the Related Art

In general, products using ESBR and natural rubber include tires, shoe soles, belts, hoses, sheets, or sealants, which must have excellent durability, and adhesives which must have excellent adhesion. In order to finally complete these products, it is common to directly input rubber as a raw material together with processing aids including reinforcing materials, additives, etc. into a blender and mix the input materials in a bulk state, or mix the input materials together after manufacturing a master batch, and thus a final rubber composite product can be produced. Korean Patent Publication No. 10-2020-0031529 introduces the results of improving the performance of rubber composites by dispersing a hydrocarbon traction resin in ESBR. However, types of extended resins include coumaron-indene-resin, petroleum resin, terpene polymer, alphamethyl styrene resin, and mixtures thereof, which have a glass transition temperature (Tg) exceeding 30° C. Since these materials are generally well soluble in organic solvents, rubbers such as solution styrene-butadiene rubber (SSBR), styrene-butadiene-styrene rubber (SBS), styrene-ethylene-butadiene-styrene rubber (SEBS), butadiene rubber (BR), butyl rubber (IR), isoprene-isobutylene rubber (IIR) or ethylene propylene rubber (EPM), ethylene propylene diene rubber (EPDM), and polyolefin elastomer (POE), which are prepared by solution polymerization, may be extended into a liquid phase by dissolving the resin in an organic solvent, followed by removing the solvent, thereby easily manufacturing a solidified product.

However, in order to manufacture a solidified ESBR product by extending hydrophobic oil and a resin for imparting functionality to natural rubber latex obtained from nature, to ESBR that is a product that uses water as a solvent for rubber manufacturing, and natural rubber latex obtained from nature, uniform dispersion in ESBR is enabled only when the oil and resin to be extended are dispersed in water using an emulsifier in the SBR latex polymer from which unreacted monomers such as styrene and butadiene have been removed.

SUMMARY

The present disclosure relates to a method for preparing a polybutene (PIB) extended rubber composition capable of improving the physical properties of synthetic rubber and natural rubber using water as a solvent, a rubber composition prepared by the method, and a tire manufactured by using the same.

In order to achieve the object of the present disclosure, the present disclosure provides a method for preparing a rubber composition in which polybutene is dispersed in rubber in a solution phase (PIB extended rubber), the method comprising the steps of: dispersing hydrophobic extender oil and polybutene in water to prepare an extender oil/polybutene emulsion (1); adding the extender oil/polybutene emulsion (1) to a latex-shaped rubber composition (2) and uniformly dispersing the same in a solution to prepare a rubber/extension oil/polybutene composition; and solidifying, drying and molding the rubber/extender oil/polybutene composition in a latex shape through salting-out and acid precipitation.

According to an embodiment of the present disclosure, the rubber is preferably synthetic rubber or natural rubber.

According to an embodiment of the present disclosure, the synthetic rubber is preferably any one selected from the group consisting of an emulsion styrene butadiene rubber (ESBR), nitrile butadiene rubber (NBR), modified nitrile butadiene rubber, chloroprene rubber, epoxy isoprene rubber, carboxylic acid nitrile butadiene rubber, and a combination thereof.

According to one embodiment, the synthetic rubber is preferably emulsion styrene butadiene rubber (ESBR).

According to an embodiment, the latex-shaped rubber composition (2) is preferably prepared by comprising the step of performing an emulsion-polymerization reaction of a composition including a monomer, water, an emulsifier, and an additive, and then recovering residual monomers.

According to an embodiment, the monomer for preparing the rubber composition is preferably at least one selected from the group consisting of styrene, alphamethyl styrene, butadiene, isoprene, acrylonitrile, methylmethacrylate, methacrylic acid, and chloroprene.

According to an embodiment, the polybutene has a number average molecular weight of 300 to 3,000 g/mol, and the polybutene is preferably added in an amount of 1 to 10 wt % on the basis of the rubber content.

According to an embodiment of the present disclosure, the rubber composition prepared according to the present disclosure is preferably used as a rubber composition for a tire tread, a rubber composition for a shoe sole, a rubber composition for a belt, or a rubber composition for an asphalt additive.

In order to achieve another object of the present disclosure, the present disclosure provides a rubber composition for a tire tread comprising the rubber composition prepared according to the present disclosure.

In order to achieve still another object of the present disclosure, the present disclosure provides a tire manufactured using the rubber composition for a tire tread according to the present disclosure.

According to an embodiment of the present disclosure, the polybutene is a C4-based polymer using isobutylene as a main monomer, has a number average molecular weight of 300 to 3,000 g/mol, and may be used in an amount of 0.1 to 27.3 wt %, preferably 1 to 10 wt %, on the basis of the rubber content.

The rubber composition prepared according to the present disclosure can increase the physical properties of a final rubber product. In addition, the tire manufactured using the rubber composition prepared according to the present disclosure has improved grip properties (wet road surface grip), low fuel economy characteristics, and test piece performance. In addition, the preparation method of the rubber composition according to the present disclosure can significantly improve the physical properties of rubber products while using existing facilities, thereby considerably lowering the unit cost, and is an excellent environmentally friendly method by using polybutene that is an eco-friendly resin.

DETAILED DESCRIPTION

The present disclosure will now be described in more detail, which is, however, for the purpose of describing the present disclosure and should not be construed as a method of limiting the scope of the present disclosure.

The present disclosure provides a method for preparing a rubber composition in which polybutene is dispersed in a solution (PIB extended rubber), the method comprising the steps of: dispersing hydrophobic extender oil and polybutene in water to prepare an extender oil/polybutene emulsion (1); adding the extender oil/polybutene emulsion (1) to a latex-shaped rubber composition (2) and uniformly dispersing the same in a solution to prepare a rubber/extension oil/polybutene composition; and solidifying, drying and molding the rubber/extender oil/polybutene composition in a latex shape through salting-out and acid precipitation. Solution and Commercialization of Extender Oil/Polybutene The advantage of the present disclosure is in that a rubber composition capable of providing a desired rubber having excellent physical properties can be prepared through a simple process change to the existing extender oil emulsion preparing method in the method for preparing an extender oil emulsion by adding polybutene without changing raw materials and processing steps.

In the existing process for preparing an emulsion by dispersing the existing hydrophobic extender oil in water, a process for changing the emulsion preparing process to the step of preparing an extender oil/polybutene emulsion by dispersing polybutene in water together with the extender oil is necessarily performed.

According to the present disclosure, such a process is advantageous in that unexpected and surprising effects in the physical properties of rubber obtained by such process changes can be exhibited while utilizing existing equipment.

In addition, in the present disclosure, it is necessary to perform an intermediate step in which a uniformly mixed rubber/extender oil/polybutene composition by adding the polybutene emulsion to a latex-shaped rubber composition is prepared is.

As used herein, the term "latex-shaped rubber composition" refers to a synthetic rubber composition which is prepared by emulsion polymerization in a form in which micelles including rubber particles are dispersed in an aqueous solution, and has a milk-like shape, and includes natural rubber latex.

A rubber composition in which polybutene is uniformly dispersed may be prepared by solidifying the rubber/extender oil/polybutene composition in a latex shape through salting-out and acid precipitation, followed by drying and molding. Only when the thus-prepared rubber composition is used, a rubber having desired final properties can be obtained.

Here, the final properties may vary depending on the type of rubber product. For example, when a tire tread is a final rubber product, excellent braking characteristics and low fuel consumption characteristics are required, and thus durability, grip characteristics, and low rolling resistance are important factors.

Therefore, in the present disclosure, when manufacturing a tire tread, it is necessary to prepare a rubber composition for a tire tread, and when preparing the rubber composition for a tire tread, the step of preparing an ESBR rubber composition should be included, the ESBR rubber composition prepared by preparing a polybutene (PIB) emulsion on the rubber used and then mixing the same with a rubber latex intermediate product from which unreacted monomers have been removed, solidifying the mixture through salting-out and acid precipitation, drying, and molding. The rubber useful when manufacturing a tire tread may be synthetic rubber or a mixture of natural rubber and synthetic rubber.

The natural rubber may be a general natural rubber or a modified natural rubber. Any general natural rubber may be used as long as it is known as natural rubber, and the country of origin is not limited. The natural rubber may contain cis-1,4-polyisoprene as a main substance and may also contain trans-1,4-polyisoprene depending on the properties required. Therefore, in addition to the natural rubber containing cis-1,4-polyisoprene as the main substance, the natural rubber may contain trans-1,4-isoprene as a main substance, such as Valata that is a kind of rubber of the Sapota family from South America.

The modified natural rubber means that the general natural rubber is modified or purified. For example, the modified natural rubber may include epoxidized natural rubber (ENR), deproteinized natural rubber (DPNR), and hydrogenated natural rubber. The synthetic rubber may be any one selected from the group consisting of styrene butadiene rubber (ESBR, SSBR), modified styrene butadiene rubber, butadiene rubber (BR), modified butadiene rubber, chlorosulfonated polyethylene rubber, epichlorohydrin rubber, silicone rubber, nitrile rubber, hydrogenated nitrile rubber, Nitrile butadiene rubber (NBR), modified nitrile butadiene rubber, styrene butadiene styrene rubber (SBS), styrene ethylene butadiene styrene (SEBS) rubber, ethylene propylene rubber (EPM), ethylene propylenediene (EPDM) rubber, hypalon rubber, Chloroprene rubber, ethylene vinyl acetate rubber, acrylic rubber, hydrin rubber, vinyl benzyl chloride styrene butadiene rubber, bromomethyl styrene butyl rubber, styrene butadiene maleate rubber, carboxylic acid styrene butadiene rubber, epoxy isoprene rubber, ethylene propylene maleate rubber, carboxylic acid nitrile butadiene rubber, brominated polyisobutyl isoprene-coparamethylstyrene (BIMS), and combinations thereof.

The polybutene (PIB) is preferably a highly reactive polybutene (HRPIB), and a polybutene having a number average molecular weight of 150 to 3,000 g/mol, preferably 300 to 3,000 g/mol. may be used. This is because the highly reactive polybutene (HRPIB) has a carbon-carbon double bond mainly located at the end of polybutene (PIB), increasing the bonding property with respect to a raw rubber, and thus favorably acts during the reaction, compared to the existing polybutene (CPIB*, polybutene with an alpha double bond content of less than 40%). In such a way, polybutene may be used differently depending on the desired properties of the final rubber product.

According to an embodiment of the present disclosure, polybutene is a C4 polymer having a number average molecular weight of 300 to 3,000 g/mol, and may be contained in an amount of 0.1 to 27.3 wt %, preferably 1 to 10 wt %, on the basis of the rubber content.

If the polymer is contained less than 1 wt % on the basis of the rubber content, the physical properties of the final rubber product are not significantly improved, and if the polymer is contained more than 10 wt %, the original physical properties of the rubber may not appear.

For example, the ratio of the extender oil contained in the extended rubber of commercially produced oil is mostly 37.5 phr. Therefore, in order to make 1 wt % (1.4 phr of rubber) of polybutene included in the rubber to be extended with the extender oil/polybutene, the ratio of the extender oil/polybutene contained in the extender oil/polybutene emulsion is 173/7 (346 g TDAE/14 g polybutene), thereby extending 1 wt % of polybutene to the rubber. Here, the concentration of the prepared extender oil/polybutene is adjusted by adding water.

The latex-shaped rubber composition is preferably prepared by comprising the step of performing an emulsion polymerization reaction of a composition comprising a monomer, water, an emulsifier, and an additive, and then recovering the residual monomer.

According to an embodiment of the present disclosure, the monomer for preparing the rubber composition is preferably at least one selected from the group consisting of styrene, alphamethyl styrene, butadiene, isoprene, acrylonitrile, methyl methacrylate, methacrylic acid, and chloroprene.

According to an embodiment of the present disclosure, the rubber composition is preferably used as a rubber composition for a tire tread, a rubber composition for an industrial belt, or the like.

In order to achieve another object of the present disclosure, the present disclosure provides a rubber composition for a tire tread comprising the ESBR rubber composition prepared according to the present disclosure.

In addition to the above-described raw rubber and highly reactive polybutene (HRPIB), the rubber composition for a tire tread according to an embodiment of the present disclosure may include rubber compounding agents generally used in the rubber composition for a tire tread, such as silica and/or carbon black as a reinforcing filler, process oil as a softener, sulfur as a vulcanizing agent, CBS and 1,3-diphenylguanidine (DPG) as vulcanization accelerators, zinc oxide as a vulcanizing activator, stearic acid, a coupling agent for improving dispersibility, an anti-aging agent, and the like.

The silica that can be used as a reinforcing filler in the present disclosure is not particularly limited in its kind, but it is preferable that the surface area is 175±5 m²/g, the moisture content is 6.0±0.5% by weight, and the silicon dioxide (SiO2) content is 90% by weight or more.

The carbon black used in the present disclosure is not particularly limited in its kind, but it is preferable that the BET (Brunauer, Emmett, Teller) specific surface area is 80 to 90 m²/g, and the DBP (Di-n-butyl Phthalate) adsorption value is 100 to 110 g/100 g, and the iodine adsorption value is in the range of 90 to 120 mg/g. The carbon black is preferably used in the amount of 40 to 100 parts by weight, on the basis of 100 parts by weight of the raw rubber. If the amount is less than 40 parts by weight, sufficient reinforcing effect may not be exhibited, which is not desirable, and if the amount exceeds 100 parts by weight, heat generation and wear resistance effect may not be exhibited, which is not desirable, either.

The extender oil acts as a softener, and it is preferable that the aromatic content in the oil is 5 to 25% by weight, the naphthene content is 25 to 45% by weight, and the paraffinic content is 35 to 65% by weight. Other various additives used in the present disclosure are general components used in rubber compositions for tire treads, and detailed descriptions thereof will not be given.

As described above, the rubber composition for a tire tread according to the present disclosure can improve the grip on the tread portion of an automobile tire, fuel economy and wear performance without affecting various basic physical properties of the tire, while continuously maintaining the improved properties.

In order to achieve still another object of the present disclosure, provided is a tire manufactured using the rubber composition for a tire tread according to the present disclosure.

Hereinafter, the present disclosure will be described in more detail with reference to specific examples and comparative examples. However, this is merely for explaining the present disclosure in a more easily understandable way and should not be construed as a method of limiting the scope of the present disclosure.

Preparation Example 1: Preparation of ESBR Latex

To a 10 L pressure reactor equipped with a mechanical stirrer were added at 5° C. 3200 mL of deionized water, 46 g of potassium rosinate, 74 g of fatty acid potassium, 7.0 g of potassium chloride, 560 g of styrene, 1440 g of butadiene, 1.0 g of EDTA, 1.0 g of sodium hydrosulfite, 0.2 g of ferrous sulfate, 0.6 g of sodium formaldehyde sulfonate, 2.0 g of tertiarydodecylmercaptan, and 1.2 g of methane hydroperoxide, followed by stirring for 8 hours. 2.0 g of diethylhydroxy amine was added to stop the reaction. Thereafter, unreacted butadiene was removed by raising the temperature of the reactor to 20° C. while stirring, unreacted styrene was removed by distillation under reduced pressure, thereby preparing a styrene-butadiene latex having a weight average molecular weight of 1,058,000 g/mol, MWD of 4.2, styrene content of 23.6%, and total solid content (TSC) of 25%.

Preparation Example 2: Preparation of Extender Oil/Polybutene Emulsion

To a 1 L glass reactor equipped with a mechanical stirrer were added at a temperature of 60° C. 46 ml of water from which cations have been removed, 3.1 ml of 25 wt % caustic soda water (NaOH aqueous solution), and 7.1 g of distilled tall oil (DTO), followed by stirring until complete saponification was reached. After confirming that DTO was completely emulsified in water, 360 g of TDAE oil heated to 60° C., 4.2 g of antioxidant K-13, and 180 ml of water were added, and stirred vigorously for 30 minutes, thereby preparing an extender oil emulsion. An emulsion containing extender oil/polybutene was prepared by adding a predetermined portion of polybutene in place of the extender oil in the step of adding the extender oil. Polybutene can be extended to rubber by adjusting the ratio of the extender oil/polybutene contained in the extender oil/polybutene emulsion to the rubber to be extended. Here, the concentration of the prepared extender oil/polybutene is adjusted by adding additional water.

Preparation Example 3: Preparation of ESBR with Extender Oil/Polybutene Extended After polymerization, 800 g of styrene-butadiene latex (latex-shaped rubber composition) prepared in Preparation Example 1 was added to a 4 L glass reactor equipped with a mechanical stirrer while being maintained at 60° C., and the temperature was raised until the temperature reached 60° C. 200 g of the 60° C. extender oil/polybutene emulsion prepared in Preparation Example 2 was added to the heated latex, followed by stirring for 10 minutes. Then, after the salting-out by adding 500 ml of a saturated sodium chloride aqueous solution at 60° C., the acid precipitation process was carried out step by step in which diluted sulfuric acid was added until the pH reached, thereby preparing ESBR rubber particles in which the extender oil/polybutene is extended in a water phase. After separating the rubber particles, washing with deionized water at 60° C. was performed three times to then separate the particles, followed by drying in a 100° C. hot air dryer, thereby preparing an ESBR sample having 37.5 phr of extender oil/polybutene extended.

Comparative Preparation Example 1

An extender oil emulsion was prepared in the same manner as in Preparation Example 2, except that only the TDAE oil of Preparation Example 2 was used.

Comparative Example 1: ESBR with Only TDAE Oil Extended

An ESBR sample was prepared in the same manner as in Preparation Example 2 using an extender oil emulsion prepared only with TDAE oil of Comparative Preparation Example 1 to the ESBR latex of Preparation Example 1.

Example 1: Oil-Extended ESBR Containing 1 wt % PIB

The procedure was carried out on the ESBR latex of Preparation Example 1 according to the method of Preparation Example 2, but the ESBR sample was prepared in the same manner as in Preparation Example 3 by using the extender oil/polybutene emulsion prepared by adding 346 g of extender oil (TDAE) and 14 g of polybutene (HRPIB470*).

* Polybutene: HRPIB470 manufactured by Hanwha Total Petrochemical Co., Ltd.

HRPIB470: high reactive PIB (Mn 1,300 g/mol)

Example 2: Oil-Extended ESBR Containing 3 wt % PIB

The procedure was carried out on the ESBR latex of Preparation Example 1 according to the method of Preparation Example 2, but the ESBR sample was prepared in the same manner as in Preparation Example 3 by using the extender oil/polybutene emulsion prepared by adding 320 g of extender oil (TDAE) and 40 g of polybutene (HRPIB470).

Example 3: Oil-Extended ESBR Containing 5 wt % PIB

The procedure was carried out on the ESBR latex of Preparation Example 1 according to the method of Preparation Example 2, but the ESBR sample was prepared in the same manner as in Preparation Example 3 by using the extender oil/polybutene emulsion prepared by adding 294 g of extender oil (TDAE) and 66 g of polybutene (HRPIB470).

Example 4: Oil-Extended ESBR Containing 10 wt % PIB

The procedure was carried out on the ESBR latex of Preparation Example 1 according to the method of Preparation Example 2, but the ESBR sample was prepared in the same manner as in Preparation Example 3 by using the extender oil/polybutene emulsion prepared by adding 228 g of extender oil (TDAE) and 132 g of polybutene (HRPIB470).

The contents of extender oil/polybutene in the ESBR samples prepared according to Examples and Comparative Examples are shown in Table 1.

TABLE 1

|  | Comparative Example 1 | Example 1 | Example 2 | Example 3 | Example 4 |
|---|---|---|---|---|---|
| Extender oil/ polybutene in prepared sample (wt%) | 27.3/0 | 26.3/1 | 24.3/3 | 22.3/5 | 17.3/10 |
| Extender oil/ polybutene in prepared sample (phr) | 37.5/0 | 36.1/1.4 | 34.0/3.5 | 30.6/6.9 | 23.7/13.8 |

Compounding Evaluation: Comparative Example 1 and Examples 1 to 4

A composite material which was yet to be crosslinked was prepared using Moriyama's MIX-LABO (Mixing capacity: 0.5 liter, Main motor: 15HP) in the composition shown in Table 2.

TABLE 2

(Unit: PIB, ESBR and BR each being in weight ratio, and other additives each being in weight ratio on the basis of 100 parts by weight of total rubber composition)

|  | Comparative Example 1 | Example 1 | Example 2 | Example 3 | Example 4 |
|---|---|---|---|---|---|
| Amount of polybutene contained in ESBR (wt%) | 0 | 1 | 3 | 5 | 10 |
| ESBR | 70 | 70 | 70 | 70 | 70 |
| BR (LG 1208) | 30 | 30 | 30 | 30 | 30 |
| ZnO | 3 | 3 | 3 | 3 | 3 |
| St-A | 2 | 2 | 2 | 2 | 2 |
| Silica (VN3) | 50 | 50 | 50 | 50 | 50 |
| Si-69 | 4.0 | 4.0 | 4.0 | 4.0 | 4.0 |
| Sulfur | 1.5 | 1.6 | 1.7 | 1.8 | 2.0 |
| DPG | 1.8 | 1.8 | 1.8 | 1.8 | 1.8 |
| CBS | 1.8 | 1.8 | 1.8 | 1.8 | 1.8 |
| 6PPD | 0.2 | 0.2 | 0.2 | 0.2 | 0.2 |

Blending was performed in two steps. For first kneading, primary rubber was obtained by filling 75% of the volume of a 0.5 liter blender and adding a rubber composition, a filler (silica), zinc oxide (ZnO), stearic acid, and a silane coupling agent (Si-69) under the condition of rotor rotation speed being 70 rpm.

For second kneading, the blend was cooled to room temperature, sulfur, DPG (Diphenyl Guanidine), CBS (N-cyclohexyl-2-benzothiazole sulfenamide), and antioxidant (6-PPD) were added, followed by kneading for 2 minutes at 50 rpm.

For crosslinking of the blended rubber composites, each rubber composite was crosslinked in a 160° C. high-temperature press for a time of T90 plus 90 seconds, obtained by measuring the vulcanization properties under the conditions of 160° C., 40 minutes, and 1% strain using a rubber process analyzer (RPA), thereby preparing a rubber composite test piece for a tire tread.

As other additives, 3 parts by weight of zinc oxide (ZnO), 2 parts by weight of stearic acid (St-A), 50 parts by weight of silica (VN3, Evonik), and 4 parts by weight of silica coupling agent (SI-69), were added with respect to 100 parts by weight of a rubber composition comprising SBR, BR and PIB to prepare a first blend (SMB, silica master batch), and depending on the content of polybutene compared to the first blend, 1.5 to 2.0 parts by weight of sulfur, 1.8 parts by weight of diphenylguanidine (DPG) and 1.8 parts by weight of cyclohexylbenzothiazole sulfenamide (CBS) as vulcanization accelerators, and 0.2 parts by weight of an antioxidant (6PPD) were further added to prepare a second blend (FMB, final master batch).

EXPERIMENTAL EXAMPLE

Physical properties of the respective rubber composite test pieces prepared according to the above-described Comparative Examples and Examples were measured in the following manner according to ASTM related regulations, and the results are shown in Table 3 below.

specified in JIS K6251, and 100% modulus (M100), 200% modulus (M200), and tensile stress at break. TB and tensile breaking point elongation EB were measured.

(6) Elongation: The elongation was measured as the strain (%) up to the breaking point when measuring the tensile strength.

(7) Viscoelasticity: The viscoelasticity was measured using dynamic mechanical analysis (DMA), and 0° C. Tan δ is used as a substitute value for the braking performance of a tire on a wet road surface. The higher the value, the better the performance. 60° C. Tan δ is used as a substitute value for tire rolling resistance, and the lower the value, the better the rolling resistance, indicating that the fuel efficiency increases.

(8) Wear: The wear is measured by measuring a reduced weight due to wear according to the ASTM D5963 method while applying a load of 5 N using a DIN wear tester, and is expressed as a relative index, indicating that the higher the value, the better the wear performance.

TABLE 3

| Physical property | | Comparative Example 1 | Example 1 | Example 2 | Example 3 | Example 4 |
|---|---|---|---|---|---|---|
| Processability | Blend viscosity (MV) | 43 | 46 | 48 | 48 | 45 |
| Crosslinkability | Crosslinking density (dNm) | 20 | 19 | 22 | 22 | 18 |
| Tensile property | Hardness (SHORE-A) | 67 | 68 | 68 | 67 | 64 |
| | 100% Modulus (kgf/cm2) | 36 | 37 | 37 | 43 | 35 |
| | 200% Modulus (kgf/cm2) | 78 | 84 | 86 | 100 | 82 |
| | Tensile strength (kgf/cm2) | 126 | 134 | 129 | 124 | 111 |
| | Elongation (%) | 293 | 288 | 273 | 237 | 249 |
| Viscoelasticity | 0° C. Tanδ | 0.1012☐ | 0.1035 | 0.1066 | 0.1057 | 0.1094 |
| | 60° C. Tanδ | 0.0769☐ | 0.0795 | 0.0831 | 0.0832 | 0.0696 |
| Wear | Index | 100 | 108 | 105 | 102 | 100 |

(1) Blend Viscosity (Mooney Viscosity, MV)

The Mooney viscosity was determined by measuring the value read at 4 minutes after starting the rotor with 1 minute preheating using a large-sized rotor at 100° C. using a Mooney viscometer (MV2000, Alpha Technology).

(2) Crosslinking Density

For crosslinking of the blended rubber composite, the crosslinking density was measured by subtracting the minimum value from the maximum torque value while measuring the vulcanization properties under the conditions of 160° C., 40 minutes and 1% strain using a rubber process analyzer (RPA).

(3) Hardness: The hardness test was conducted in accordance with JIS K6253 (2001), and the spring hardness HA (Shore-A hardness) was measured.

(4) Modulus: The modulus measurement was carried out with a tensile tester manufactured by Instron by cutting a test piece into a dumbbell shape. 100% and 200% modulus refer to the stress applied to the test piece when the test piece is elongated by 100% and 200%, respectively.

(5) Tensile strength: For measurement of tensile strength, a vulcanized rubber sheet was drilled to prepare a No. 3 dumbbell test piece described in JIS K6251 (2001). Using this test piece, a tensile test was conducted under the conditions of a measurement temperature being 25° C. and a tensile speed being 500 mm/min according to the method As shown in Table 3, the ESBR rubber with extended PIB had improved durability, grip, and low rotational resistance, compared to the rubber without PIB, thereby attaining improved braking characteristic, low fuel consumption characteristic, and wear performance.

What is claimed is:

1. A method for preparing a rubber composition in which polybutene is dispersed in rubber in a solution phase (PIB extended rubber), the method comprising:

dispersing hydrophobic extender oil and polybutene in water to prepare an extender oil/polybutene emulsion;

adding the extender oil/polybutene emulsion to a latex-shaped rubber composition and uniformly dispersing the same in a solution to prepare a rubber/extension oil/polybutene composition; and solidifying, drying and molding the rubber/extender oil/polybutene composition on the latex shape through salting-out and acid precipitation, wherein the rubber is an emulsion styrene butadiene rubber (ESBR), and the polybutene is added in an amount of 1 wt % to 3 wt % on the basis of the rubber content.

2. The method of claim 1, wherein the latex-shaped rubber composition is prepared by performing an emulsion-polymerization reaction of a composition including a monomer, water, an emulsifier, and an additive, and then recovering residual monomers.

3. The method of claim 1, wherein the polybutene has a number average molecular weight of 300 to 3,000 g/mol.

4. The method of claim 1, wherein the rubber composition is used as a rubber composition for a tire tread, a rubber composition for a shoe sole, a rubber composition for a belt, or a rubber composition for an asphalt additive.

\* \* \* \* \*